July 16, 1940.   M. E. WHITENACK   2,208,235
ELECTRIC CONTROL
Filed Feb. 24, 1938
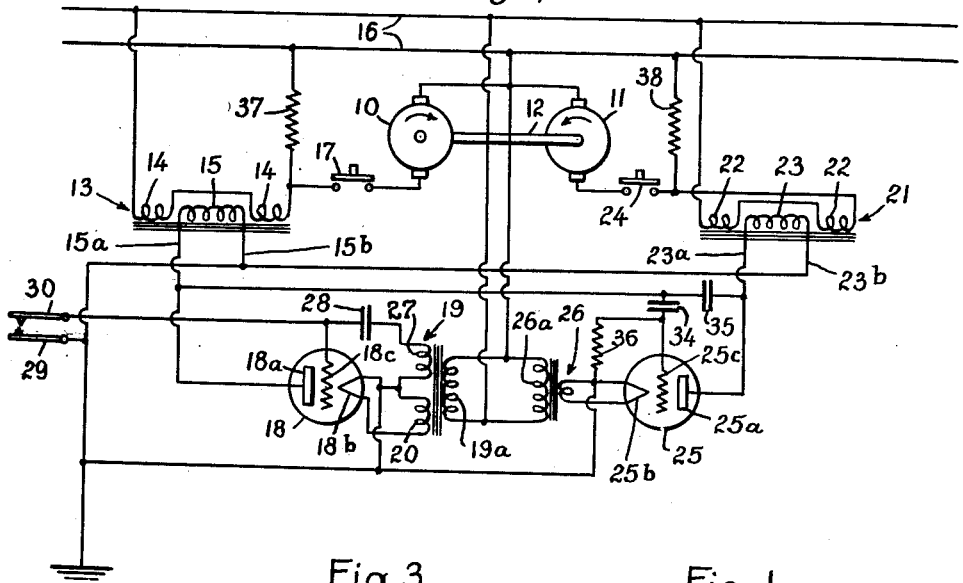
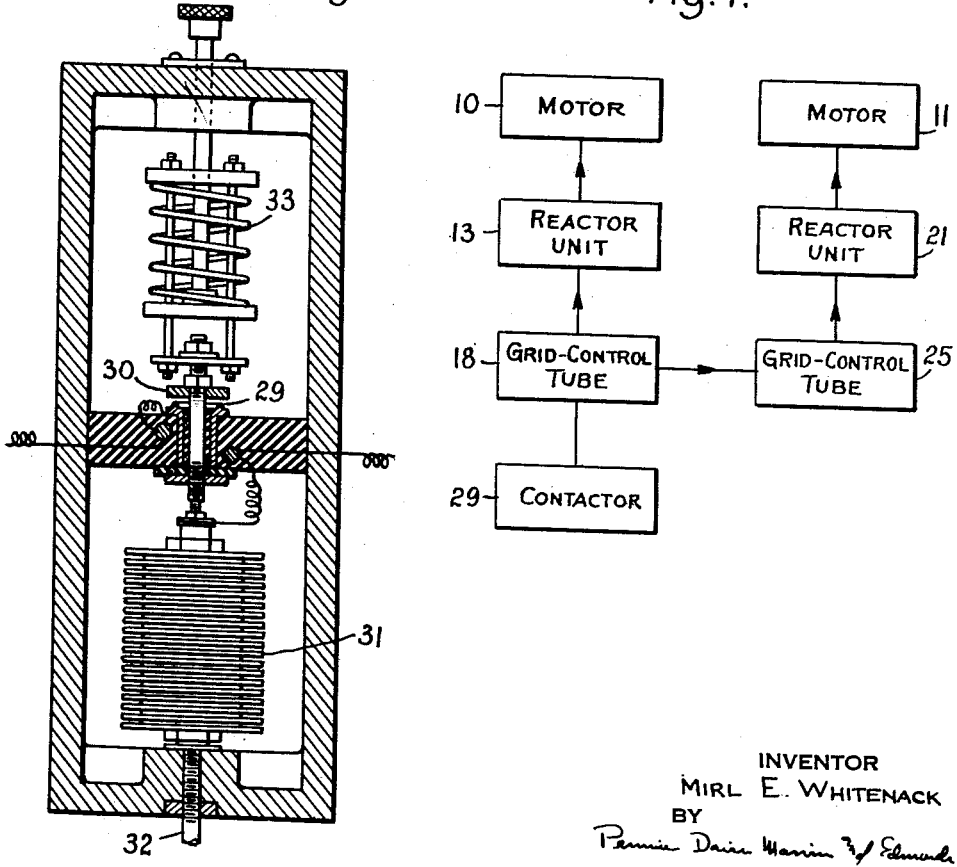
INVENTOR
MIRL E. WHITENACK
BY
ATTORNEYS Patented July 16, 1940

2,208,235

UNITED STATES PATENT OFFICE 2,208,235

ELECTRIC CONTROL

Mirl E. Whitenack, New York, N. Y., assignor to Whitenack Corporation, Chicago, Ill., a corporation of Illinois Application February 24, 1938, Serial No. 192,214

5 Claims. (Cl. 250—27)

This invention relates to electric control circuits, and has for its principal object the provision of an improved electric control circuit for controlling operation of a plurality of alternating-current devices. The invention is particularly applicable for use in circuits designed to control the operation of two interrelated alternating-current devices, such as alternating-current motors.

There are a number of uses for electrical devices so interrelated as to require the provision of means for effecting operation of only one of the devices at any given moment. For example, it may be desired to operate either one of two motors mounted on the same shaft or otherwise interconnected and to switch the operation from one motor to the other in response to a change in some operating condition. The present invention provides a control circuit capable of thus governing the operation of a plurality of interconnected alternating-current motors or other interrelated alternating current devices through the agency of a single make-and-break contact. The new control is particularly well adapted to provide for extremely prompt shift in operation from one motor or other device to the other motor or device.

The invention is described below with reference to the accompanying drawing, in which—

Fig. 1 is a block diagram of an apparatus embodying the invention;

Fig. 2 is a circuit diagram of apparatus such as that shown in block form in Fig. 1; and Fig. 3 shows one form of contact assembly that may be employed.

Referring to Fig. 1 of the drawing, the blocks 10 and 11 represent two motors or other devices to be alternately operated. The supply of operating current to the motors 10 and 11 is controlled by reactor units 13 and 21, respectively. The flow of motor-operating current through the reactor units 13 and 21 is in turn controlled by grid-control tubes 18 and 25, respectively. The operation of one tube 18 depends upon whether a contactor 29 is open or closed, and the operation of the other tube 25 is controlled by the tube 18. The reactor unit 13 is so arranged that an operating current flows through the motor 10 only when the tube 18 is passing current, which it does when the contactor 29 is closed. When the tube 18 is passing current, the tube 25 is non-conductive, so that no operating current is permitted by the reactor unit 21 to flow through the motor 11. When the contactor is opened, the tube 18 becomes non-conductive, and the reactor unit 13 therefore ceases to permit an operating current to flow through the motor 10. Under this condition, however, the tube 25 becomes conductive and passes a current which causes the reactor unit 21 to permit the flow of an operating current through the motor 11. Thus the opening or closing of a single contactor determines which of the two motors 10 and 11 is to operate. The motors cannot both be energized at the same time, but there is substantially no delay between the end of operation of one motor and the beginning of operation of the other motor.

Referring to Fig. 2 of the drawing, a pair of alternating-current motors 10 and 11 are shown diagrammatically as connected by a common shaft 12. One of the motors, 10, is arranged to rotate the shaft 12 in one direction, say clockwise, and the other motor, 11, to rotate it in the opposite direction, say counterclockwise. A reactor unit 13, comprising a reactor winding 14 and a control winding 15 having a common magnetic core, is associated with the motor 10. The reactor winding 14, which preferably consists of two coils connected in series-aiding relation as shown, is connected in series with the motor 10 and an alternating-current line 16 or other source of alternating current, and has sufficient impedance normally to prevent the flow of an operating current through the motor 10. When sufficient direct current is passed through the control winding 15, however, the common magnetic core is saturated, so that the impedance of the reactor winding 14 is greatly decreased. Under this condition, an operating current is permitted to flow through the motor 10.

If desired, a limit switch 17 may be included in series with the winding 14 and the motor 10 in order that the circuit may be opened automatically if the motor 10 rotates beyond a chosen limit.

The reactor unit 13 also functions as a transformer, so that an alternating potential is induced in the control winding 15 due to the alternating current which flows in the reactor winding 14. The resistor 37 provides a path for sufficient alternating current to thus energize the control winding 15 when the switch 17 is open.

A grid-control tube 18 is associated with the reactor unit 13 and the motor 10. One terminal 15a of the control winding 15 is connected to the anode 18a of the tube 18, and the other terminal 15b of the control winding 15 is connected to ground or common. A transformer 19, the primary winding 19a of which is connected across the line 16, is provided with a winding 20 for energizing the filament-type cathode 18b of the tube 18, and one terminal of the cathode 18b is connected to ground or common.

A second reactor unit 21 is associated with the other motor 11. The reactor unit 21, like the unit 13 described above, comprises a reactor winding 22 and a control winding 23 having a common magnetic core. The reactor winding 22, which preferably consists of two coils connected in series-aiding relation as shown, is connected in series with the motor 11 and the alternating-current line 16, and has sufficient impedance normally to prevent the flow of an operating current through the motor 11. If desired, a limit switch 24 to limit rotation of the motor 11 may be included in series with the reactor winding 22 and the motor 11. The resistor 38 provides a path for sufficient alternating current to energize the control winding 23 when the switch 24 is open.

A grid-control tube 25 is associated with the reactor unit 21. One terminal 23a of the control winding 23 of this reactor unit is connected to the anode 25a of the associated tube 25, and the other terminal 23b is connected to ground or common. A transformer 26, the primary winding 26a of which is connected across the line 16, is provided to energize the filament-type cathode 25b of the tube 25 and one terminal of this cathode is connected to ground or common.

The circuit thus far described is such that a closed path is provided for current to flow through the control winding 15 of the first reactor unit 13 whenever the tube 18 is in a condition for passing anode current, thereby enabling an operating current to flow through the reactor winding 14 and through the motor 10 in series therewith and so bringing about operation of the motor 10. Similarly, whenever the tube 25 is in condition for passing anode current, a closed path is provided for anode current to flow through the tube 25 and the control winding 23 of the second reactor unit 21, thus permitting an operating current to flow through the reactor winding 22 and through the motor 11 in series therewith to bring about operation of this motor.

Whether or not either of the tubes 18 or 25 is in condition to pass current depends upon the potential impressed upon the grid of that tube. If the charge on the grid is sufficiently negative during the positive swings of the anode, current will not flow through the tube, whereas if the grid is connected to the cathode or if the grid potential is positive with respect to the cathode during positive anode swings, current will flow through the tube.

In each tube, the anode potential with respect to the cathode is the alternating potential which is induced in the control winding of the associated reactor unit. Thus, the reactor winding 14 of the reactor unit 13 is connected through the motor 10 across the line 16, and an alternating potential is at all times induced in the control winding 15 of this reactor unit and impressed upon the anode 18a of the tube 18. Similarly, the reactor winding 22 of the second reactor unit 21 is connected through the motor 11 across the line 16, so at all times an alternating potential is induced in the control winding 23 of the reactor unit 21 and is impressed upon the anode 25a of the tube 25.

To control the flow of current through the tube 18, means are provided for impressing upon the grid 18c of this tube a negative potential during the positive half-cycle swings of the potential impressed upon the anode 18a. These means, in the embodiment shown, comprise a winding 27 on the transformer 19 connected on one side to the cathode 18b of the tube 18 and on the other side in series with a capacitor 28 to the grid 18c of the tube 18. The primary winding 19a of the transformer 19 is connected to the same source 16 of alternating current as the reactor winding 14, the polarity being such that the potential induced in the secondary 27 of the transformer 19 is substantially in phase opposition with the potential induced in the control winding 15 of the reactor unit 13. Therefore, when the anode 18a of the tube 18 is negative the grid 18c is positive and acts as one element of a half-wave rectifier. The half-wave rectifier current passes through the capacitor 28 and charges it in such a way that the terminal connected to the grid 18c is negative. Thus the grid 18c is held definitely negative as the anode 18a becomes positive, and no anode current will flow through the tube and hence no saturating current will flow through the control winding 15 of the reactor unit 13.

To discharge the capacitor 28, means are provided for connecting the grid 18c to ground or common. These means comprise a single-pole single-throw contactor 29 which may be actuated in response to the conditions by which it is desired to govern operation of the motors 10 and 11.

The grid 25c of the tube 25 is connected through a pair of capacitors 34 and 35 to the anode 25a of the same tube, and to ground or common through the resistor 36. The potential impressed upon the anode 25a of the tube 25 is provided by the control winding 23 and, since the grid 25c of the tube 25 is connected to a point on a divider network comprising the capacitors 34 and 35 in series with the resistor 36, the grid 25c normally has applied to it an alternating potential sufficiently out of phase with the anode potential due to the series capacitors 34 and 35, to prevent passage of anode current through the tube 25.

The grid 25c of the tube 25 is connected with the terminal 15a of the control winding 15 of the first reactor unit 13 by a connection leading to the junction of the capacitors 34 and 35. Thus the phase shift of the potential applied to the grid 25c of the tube 25 due to the potential across the control winding 15 will be less than that of the grid potential due to the potential across the control winding 23, since only one capacitor 34 is effectively in circuit in this case. If the potential across the control winding 15 of the reactor unit 13, therefore, is substantially equal to or greater than the potential across the control winding 23 of the reactor unit 21, it will decrease the effective phase shift of the potential applied to the grid 25c of the tube 25 from the control winding 23 and permit anode current to flow through this tube. Thus, when the grid 18c of the tube 18 becomes negatively biased upon opening the contactor 29, the flow of current through the control winding 15 of the reactor unit 13 ceases, and the potential across the terminals of the control winding 15 increases to its open-circuit value, which is approximately equal to the open-circuit potential across the terminals of the control winding 23 of the second reactor unit 21. When this occurs, and so long as the potential applied to the grid 25c of the tube 25 by the control winding 15 approximately equals or exceeds that applied by the control winding 23, the tube 25 is in condition to pass anode current. Current therefore flows through the control winding 23, and an operating current is enabled to flow through the reactor winding 22 and the motor 11. On the other hand, if the grid of the tube 18 is connected to ground by closing the contacts of contactor 29, current begins to flow through the tube 18 and the control winding 15, enabling an operating current to flow through the reactor winding 14 and the motor 10, and simultaneously the potential across the terminals of the control winding 15 drops sufficiently to enable the potential applied by the control winding 23 to regain control of the grid 25c of the tube 25 and stop current flow through this tube. Thus operation of the first motor 10 is brought about by closing the contactor 29, and operation of the motor 11 by opening this contactor.

The degree of phase shift of the potential applied to the grid 25c of the tube 25 with respect to its anode potential may be adjusted by varying the value of the resistor 36. The proper adjustment is that which provides just sufficient phase shift to prevent the tube 25 from becoming conductive unless the potential across the control winding 15 equals or exceeds that across the control winding 23.

It will be noted that in the circuit described above the grid of only one tube is biased independently of the reactor units. The bias potential applied to the grid of the other tube is obtained from the control windings of the reactor units, which also supply anode potential to the tubes. The circuit thus has as one of its features an arrangement in which the flow of current through the latter tube is brought about by a shifting of the phase relation between the potential applied to the anode and the potential applied to the grid of that tube, whereas the former tube is rendered non-conductive by maintaining the grid negative with respect to the cathode by means of grid rectification.

It will be understood that the circuit described herein is not limited to the use of any particular type of apparatus. I have found, however, that mercury-vapor tubes of the "Thyratron" type are well suited for use in the circuit. These are three-electrode tubes particularly adapted for use in connection with alternating-current circuits.

The capacitance of the capacitors 28, 34 and 35 and the values of the constants employed in the circuit depend, to some extent at least, upon the particular type of grid-control tubes to be employed. With tubes of the Thyratron type FG–17, for example, used in a circuit conveniently designed to operate from a 110-volt, 60-cycle alternating-current line, capacitors having a capacitance of 0.01 microfarad have been employed successfully. In such an embodiment, the open-circuit potential across the control winding 15 or 23 may be approximately 850 volts, and the potential across the winding 27 of the transformer 19 may be approximately 220 volts. Under these conditions, the system is substantially independent of all normally encountered variations in the characteristics of the tubes 18 and 25, and within wide limits is independent of the voltage rating of the controlled devices or motors 10 and 11. The windings employed to energize the filament-type cathodes of the tubes are, of course, designed to provide the proper cathode voltage which, in the case of tubes of the Thyratron type FG–17, is 2.5 volts.

The reactor units employed are of conventional construction and designed to embody reactor windings having sufficient impedance normally to prevent the flow of an operating current through the devices with which they are in series. The control windings of the reactor units 13 and 21 are so designed with respect to the reactor windings that when the associated tube is in condition for passing current, the flow of direct current through the control winding of the reactor unit is sufficient to enable an operating current to flow through the reactor winding.

The contact assembly shown in Fig. 3 of the drawing may be employed when it is desired to actuate the contactor 29 and thus control operation of the motors in response to changes in pressure conditions. For this purpose, one of the contact members 30 is connected mechanically to an expansible bellows 31. The bellows 31 communicates through a tube 32 with the point where the controlling pressure changes occur. A spring 33 balances the bellows at a point corresponding to normal pressure conditions. If the pressure should increase, the bellows 31 expands, thus separating the contact members 30 and 29, or, if the pressure drops, the bellows 31 collapses and closes contact members 30 and 29. It is understood that the contact assembly shown in Fig. 3 of the drawing is described only by way of an example of one type of contact assembly that may be employed. Any contact assembly responding to the particular conditions that it is desired to have govern operation of the motors or other devices may be employed in place of the pressure-sensitive contact assembly referred to herein by way of example. In any event, however, the contact assembly is such that when conditions tend in one direction the contact members 30 and 29 are closed and the grid 18c of the tube 18 is thereby connected to ground or common and hence the capacitor 28 discharged, and when conditions tend in the other direction, the contact members 30 and 29 separate, thus permitting a negative potential to be impressed upon the grid 18c of the tube 18. With the contact members 30 and 29 closed and the grid 18c of the tube 18 grounded, anode current is enabled to flow through this tube and through the control winding 15 of the reactor unit 13, thus enabling an operating current to flow through the reactor winding 14 of the reactor unit 13 and through the motor 10 in series therewith. On the other hand, when the contact members 30 and 29 are open, the grid 18c of the tube 18 becomes negative with respect to the cathode 18b so as to prevent flow of current through the tube and through the control winding 15, and hence the motor 10 does not operate.

The control circuit of the invention is extremely sensitive and prompt in its response to actuation of the contact assembly. It is therefore particularly useful in installations where very sensitive and prompt control of alternating-current devices is desired.

I claim:

1. In a circuit for controlling the operation of a pair of alternating-current devices, a first grid-control tube having an anode, a second grid-control tube having a grid and an anode, a reactor winding connected in series with each of said devices and a source of alternating current and having sufficient impedance normally to prevent the flow of an operating current through said device, and means associated with each of said reactor windings for materially decreasing the impedance thereof including a winding in the anode circuit of each of said tubes, means for controlling the flow of anode current through said first tube, and means for controlling the flow of anode current through said second tube by varying the phase of the potential applied to the grid of said second tube in accordance with the flow of anode current through said first tube.

2. In a circuit for controlling the operation of a pair of alternating-current devices, first and second grid-control tubes each having a grid and an anode, a reactor winding connected in series with each of said devices and a source of alternating current and having sufficient impedance normally to prevent the flow of an operating current through said device, and means associated with each of said reactor windings for materially decreasing the impedance thereof including a winding in the anode circuit of each of said tubes, means for controlling the flow of anode current through said first tube by applying to the grid of said first tube a negative potential, and means for controlling the flow of anode current through said second tube by varying the phase of the potential applied to the grid of said second tube in accordance with the flow of anode current through said first tube.

3. In a circuit for controlling the operation of a pair of alternating-current devices, first and second grid-control tubes each having an anode, first and second reactor units each comprising a reactor winding, a control winding and a magnetic core common to said windings, each of said reactor windings being connected in series with one of said devices and a source of alternating current and each having sufficient impedance normally to prevent the flow of an operating current through the device with which it is in series, and each of said control windings being connected in the anode circuit of one of said tubes, means for controlling the flow of anode current through said first tube, and control means for controlling the flow of anode current through said second tube in inverse accordance with the flow of anode current through said first tube, said control means being actuated by voltage changes across the terminals of the control winding of the first reactor unit which accompany changes in the flow of anode current through said first tube.

4. In a circuit for controlling the operation of a pair of alternating-current devices, first and second grid-control tubes each having a grid and an anode, first and second reactor units each comprising a reactor winding, a control winding and a magnetic core common to said windings, each of said reactor windings being connected in series with one of said devices and a source of alternating current and each having sufficient impedance normally to prevent the flow of an operating current through the device with which it is in series, and each of said control windings being connected in the anode circuit of one of said tubes, means for controlling the flow of anode current through said first tube by applying to the grid of said first tube a negative potential, and control means for controlling the flow of anode current through said second tube by varying the phase of the potential applied to the grid of said second tube in accordance with the flow of anode current through said first tube, said control means being actuated by the change in the voltage across the terminals of the reactor unit control winding connected in the anode circuit of said first tube when a substantial change occurs in the flow of anode current therethrough.

5. In a circuit for controlling the operation of a pair of alternating-current devices, a first grid control tube having an anode, a second grid-control tube having a cathode, a grid, and an anode, first and second reactor units each comprising a reactor winding, a control winding and a magnetic core common to said windings, the reactor winding of the first reactor unit being connected in series with one of said pair of devices across a source of alternating current, the reactor winding of the second of said reactor units being connected in series with the other of said devices across said source of alternating current, each of said reactor windings having sufficient impedance normally to prevent the flow of an operating current through the device with which it is in series, the control windings of the first and second reactor units being connected in the anode circuits of the first and second tubes respectively, means for controlling the flow of anode current through said first tube and the control winding of said first reactor unit, and phase-shifting means for controlling anode current flow through said second tube comprising a resistance connected between the cathode and the grid of said second tube, a relatively small capacitance connecting said grid and a point in the circuit connecting the anode of said first tube and the control winding of said first reactor unit, and a relatively large capacitance connecting said grid and a point in the circuit connecting the anode of said second tube and the control winding of said second reactor unit.

MIRL E. WHITENACK.